United States Patent [19]

Arbabian

[11] Patent Number: 5,165,466
[45] Date of Patent: Nov. 24, 1992

[54] MODULAR HEAT EXCHANGER HAVING DELAYED HEAT TRANSFER CAPABILITY

[76] Inventor: Morteza Arbabian, P.O. Box 1270, Madison, Wis. 53701-1270

[21] Appl. No.: 805,556

[22] Filed: Dec. 11, 1991

[51] Int. Cl.$^5$ .................. F28D 17/00; F28D 20/00
[52] U.S. Cl. ............................ 165/4; 165/10; 165/135; 165/164; 165/902; 165/54
[58] Field of Search ............ 165/4, 10, 135, 185, 165/164, 902, 165; 126/430

[56] References Cited

U.S. PATENT DOCUMENTS

| | | |
|---|---|---|
| 2,621,903 | 12/1952 | Cohler . |
| 2,856,506 | 10/1958 | Telkes ........................ 165/902 |
| 3,409,075 | 12/1968 | Long ........................... 165/154 |
| 4,102,632 | 7/1978 | Hastings ..................... 165/165 |
| 4,200,148 | 6/1980 | Friefeld et al. ............. 165/10 |
| 4,243,349 | 8/1981 | Busch, Jr. . |
| 4,299,275 | 11/1981 | Robinson, Jr. ............ 165/104.14 |
| 4,341,263 | 7/1982 | Arbabian ..................... 165/40 |
| 4,367,791 | 1/1983 | Asami . |
| 4,415,118 | 11/1983 | Endo ........................... 165/10 |
| 4,454,911 | 6/1984 | Arbabian ................... 165/104.19 |
| 4,550,771 | 11/1985 | Arbabian ..................... 165/47 |
| 4,660,532 | 4/1987 | Tholen ........................ 165/10 |

FOREIGN PATENT DOCUMENTS

| | | | |
|---|---|---|---|
| 10819 | 5/1980 | European Pat. Off. ........ 165/10 |
| 849112 | 9/1952 | Fed. Rep. of Germany . |
| 549675 | 6/1977 | U.S.S.R. . |

Primary Examiner—Albert W. Davis, Jr.
Attorney, Agent, or Firm—Lathrop & Clark

[57] ABSTRACT

A heat exchanger has a multiplicity of modules with an outer shell which is open at the top and the bottom and is joined with other modules in a stacked array. The heat exchanger has an insulating partition which is attached to the inside surface of the shell and divides the shell into two or more flow channels. The insulating partition has a hole which connects the flow channels defined by the shell and baffle. The hole is occupied by a heat-conductive heat storage reservoir, so that heat flow from one channel to another is through the heat storage reservoir. In this way, heat may pass from one flow channel into the storage reservoir and at a latter time be exchanged with a fluid flowing in another flow channel. Heat exchange modules have multiple flow channels and the flow channels preferably have heat conducting fins for increasing the heat transfer between the flow channels and the heat storage reservoir.

11 Claims, 2 Drawing Sheets

MODULAR HEAT EXCHANGER HAVING DELAYED HEAT TRANSFER CAPABILITY

FIELD OF THE INVENTION

This invention relates to heat exchangers and heat storage devices.

BACKGROUND OF THE INVENTION

The modern high cost of energy has emphasized a cost savings associated with recovery of energy from exhaust fumes in both industrial and domestic settings. For example, modern energy efficient homes use forced ventilation to ensure a healthy change-over of the air in the home. An ideal ventilator will employ a heat exchanger between the vented air and the fresh air so that the ventilation is accomplished with a minimum level of resulting heat loss. Similarly in industrial situations, heat may be removed from waste water and combustion gas exhausts and utilized for space heating, pre-heating of industrial fluids, and pre-heating of combustion gases.

The most efficient heat exchangers are those employing counter-flow heat exchange where two streams of material which are exchanging heat flow in opposite directions through the heat exchanger. In a counter-flow heat exchanger the exhaust stream may reach temperature equilibrium with in-flowing material and the in-flowing material may be warmed to the temperature of the out-flowing material.

Conventional heat exchangers, to function effectively, require that the two fluid streams which are exchanging energy be flowing simultaneously and have approximately the same magnitude and the same heat absorbing capability. This will frequently not be the case, and some form of heat storage is required if the heat in the waste stream is not to be lost. However, conventional heat storage devices do not achieve the efficiency of a counter-flow heat exchanger. As the heat storage medium is warmed, its ability to extract heat from the waste stream is decreased. Phase change heat storage devices have been used to overcome this problem by storing heat at constant temperature. However, phase change materials cannot absorb heat below their characteristic phase change temperature and do not store any portion of the heat at a temperature higher than the characteristic phase change temperature.

My earlier U.S. Pat. No. 4,454,911, which is incorporated herein by reference, discloses a heat exchanger adapted for recovery of heat contained in waste water which is comprised of an outer chamber formed of heat insulating material and an inner bore which is filled with fluids, which acts as a heat transfer liquid medium, and has a high heat capacity. A waste water (warmer fluid) conduit runs through the bore of the chamber in a helical shape, from an inlet end to an outlet end. A supply water (cooler fluid) conduit runs through the bore of the chamber in parallel to but the opposite direction in counter-flow to the waste water conduit. The outer and the inner tubes have a plurality of horizontal and vertical baffle plates mounted within the bore of the chamber in spaced relation to divide it into a plurality of individual compartments, each compartment containing water for heat transfer, and separated from the heat transferring water in adjacent compartments. The baffles perform the further function of providing mounting for the waste water and supply water conduits within the chamber. Within the chamber a temperature gradient is created between each two adjacent compartments within the chamber. The baffle plates are formed of a heat insulating material to minimize conductive transfer of heat between the heat transfer liquid mediums of adjacent compartments.

In a typical home, however, waste heat will be available from such non-continuous flow streams as furnace exhaust gases, dryer exhaust gases, bathroom and kitchen vent air, and waste water. Heat will also be available from continuous fluid streams such as house ventilation air. Intermittent uses for waste heat include domestic hot water, space heating, and the pre-heating of combustion gases. A major use of heat in the home includes the heating of incoming vent air.

Similarly, in industry there will be numerous streams of continuous and discontinuous waste heat and numerous intermittent and continuous requirements for recovered heat. Each home or factory has a different requirement for heat exchange and heat storage, which is dependent on the amount and time-variant nature of the various sources of waste heat and uses thereof.

A counter-flow heat exchanger is desirable which can be used to efficiently recover the heat energy from various gases (such as exhaust air) and fluids (such as industrial waste fluids) and make the recovered energy available to other designated sources at a desired time. What is needed is a heat exchanger with integral heat storage which is capable of non-simultaneous heat transfer between two or more possibly dissimilar fluids.

SUMMARY OF THE INVENTION

The modular heat exchanger of this invention incorporates a heat storage capability for the non-simultaneous heat transfer in counter-flow relationship between two or more fluids. The heat exchanger of this invention is composed of a multiplicity of stacked heat exchanger modules. The modules are contained in an outer insulated shell which is open at the top and the bottom and is joined with other modules in a stacked array to form a two-dimensional heat exchanger. The heat exchanger has an insulating partition which is attached to the inside surface of the shell and divides the shell into two or more flow channels. The insulating partition has a hole which connects the flow channels defined by the shell and baffle. The hole is occupied by a heat-conductive heat storage reservoir, so that heat flow from one channel to another is through the heat storage reservoir. In this way, heat may pass from one flow channel into the storage reservoir and at a later time be exchanged with a fluid flowing in another flow channel. In the preferred embodiment of this invention, the heat exchange module will have multiple flow channels and the flow channels will have heat conducting fins for increasing the heat transfer between the flow channels and the heat storage reservoir. The heat exchange modules described above may be assembled into a heat exchanger for the exchange of heat between sources of waste heat, such as waste fluids, combustion gases, vent gases, exhaust air, and sinks of heat such as domestic hot water heating, space heating and combustion gas pre-heating. Thus, the heat exchange modules described above may be used to construct an integrated, modular, two-dimensional counter-flow and multi-media heat exchanger having time-delayed heat transfer capability.

It is an object of the present invention to provide an efficient and integrated heat exchanger system which may be used in counter-flow or parallel flow for a multiple combination of gases and/or liquids.

It is another object of the present invention to provide a heat exchanger which incorporates heat storage so that the flow of heat exchanging fluids need not occur simultaneously.

It is a further object of the present invention to provide a modular heat exchanger with heat storage capability which will allow the cost-effective assembly of a heat exchanger heat storage system which is applicable for a wide range of uses and may be matched to a particular requirement.

It is also an object of the present invention to provide a heat exchanger with heat storage capability for the non-simultaneous heat transfer between dissimilar fluids.

Further objects, features, and advantages of the invention will be apparent from the following detailed description when taken in conjunction with the accompanying drawings.

DESCRIPTION OF THE PREFERRED EMBODIMENT

Figure 5:
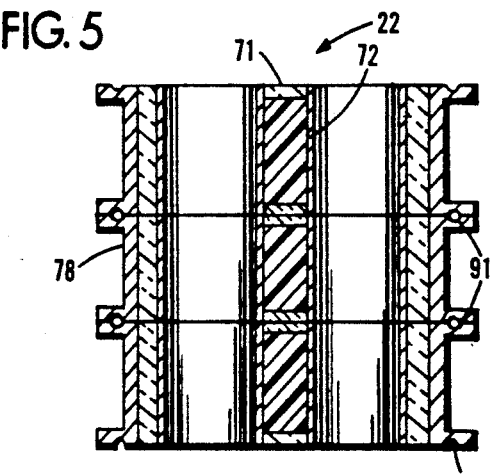
FIG. 5 is a cross-sectional view of an array of three of the heat exchanger modules of FIG. 4 taken along section line 5—5.
Figure 6:
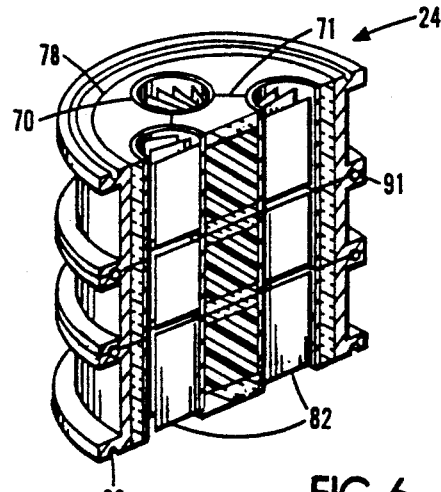
FIG. 6 is an isometric cross-sectional view of a modification of the embodiment of the array heat exchanger module of FIG. 4 having heat transfer fins within the channels.
Figure 7:
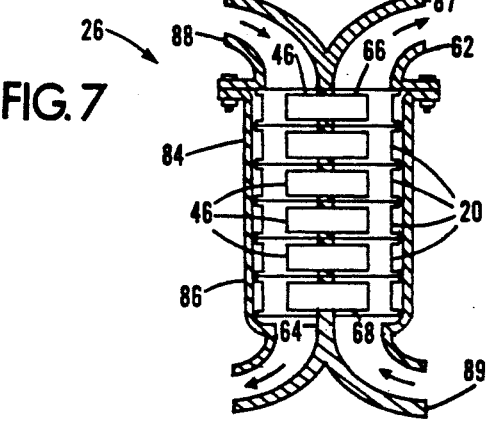
FIG. 7 is a schematic cross-sectional view of the integrated heat exchanger of this invention shown comprised of a stack of modules.

Referring more particularly to FIGS. 1-8, wherein like numbers refer to similar parts, heat exchanger modules 20, 22, 24 are shown in FIGS. 1-6, and a heat exchanger 26 is shown in FIG. 7. The heat exchanger module 20 has an outer shell 28 with portions of the outer shell 28 forming flanges 30, shown in FIGS. 2 and 3, which allow the joining of similar modules 20 to form a stacked array of modules 20 which form an integrated heat exchanger. The outer shells may be joined by axially extending bolts (not shown) which join stacked modules by passing through bolt holes 32 in the peripheral flanges 30. The interior 34 of the shell 28 is lined with an insulating material forming an insulating lining 36. An insulating baffle 38 divides the interior 40 of the heat exchanger module 20 into two flow passages 42, resulting in two flow channels 42, which are parallel and co-extensive but insulated one from the other. The insulating baffle 38 has portions defining a hole 44 which penetrates the baffle 38 and adjoins the flow passages 42.

Spaced within the hole 44 in the baffle 38 is a thermally conductive heat retentive storage reservoir 46. The heat reservoir 46 has an outer surface 48 which is divided by the baffle 38 into two regions 50, 52.

Protruding from the outer surface 48 of the heat reservoir 46 are a multiplicity of thermal fins or protrusions 54 of heat conducting material which serve to improve the heat transfer between fluids—which may be gases or liquids, or a solid suspended in a gas or liquid—flowing in the flow channels 42 and the heat reservoir 46. The interior 56 of the heat reservoir 46 is filled with a heat conducting heat storage material 58. This material 58 may be water, or any suitable solid or liquid having appropriate thermal properties for a particular application.

The effect of the insulated lining 36 and the insulated baffle 38 is to prevent substantially all heat transfer between the flow channels 42, except through the heat storage reservoir 46. The fins 54 and the heat conducting outer surface 48 of the reservoir are designed to facilitate the rapid and efficient transfer of heat from a fluid flowing in one of the fluid flow channels 42 into the reservoir 48, and then into the other flow channel 42.

In a conventional counter-flow heat exchanger, two fluids of dissimilar temperature exchange heat through a thermally conductive barrier between two fluids. The difference in temperature between the heat exchanging fluids creates a thermal gradient within the barrier which causes heat to flow from one fluid to the other. In order for a conventional heat exchanger to function, both fluids must be present in the heat exchanger at the same time, thus producing a thermal gradient which causes heat transfer to occur.

In many situations, however, the fluid flows between which it is desirable to exchange heat are not simultaneous, and it will, therefore, be desirable to add the function of heat storage. A number of heat exchanger modules 20 may be assembled into an integrated heat exchanger, shown schematically in FIG. 7, having a multiplicity of heat storage reservoirs 46 which advantageously combines the principle of counter-flow heat exchange with heat storage to develop a super-efficient counter-flow heat exchanger with simultaneous and/or non-simultaneous heat transfer between two fluids.

In a counter-flow heat exchanger, the fluid to be heated enters the in-feed end of the heat exchanger and the heating fluid enters the opposite end of the heat exchanger. The fluid being heated first meets and exchanges heat with the heating fluid that has already passed through the heat exchanger and given up most of its heat. The incoming, unheated fluid, due to its low temperature is able to absorb some heat from this heating fluid. As the heated fluid moves through the heat exchanger, it absorbs heat from heating fluid which is at a progressively higher temperature.

Finally, at the exit of the heat exchanger, the material which is being heated and which has almost reached its maximum temperature, meets the hottest heating fluid, which has not yet been cooled by contact with any of the heated fluid. Because the two fluids flow through the heat exchanger in opposite directions, nearly all of the possible heat is exchanged between the fluid flows, so that the fluid being heated leaves the heat exchanger at a temperature very nearly equal to the incoming heating fluid temperature, and the heating fluid leaves the heat exchanger with a temperature nearly equal to the original temperature of the unheated fluid.

When the heat exchanger modules 20 are stacked to form an integrated heat exchanger 26, shown in FIG. 7, an array of heat reservoirs 46 is formed with each heat reservoir sealed and insulated from the heat reservoirs on either side of it by portions 60 of the heat baffle 44, which thermally isolate each flow channel from the other, except through the heat reservoir 46.

As a hot fluid flows from the top 62 to the bottom 64 of the heat exchanger 26, it will exchange heat with the storage reservoirs 46 in a progressive fashion, so that the uppermost reservoir 66 will reach the highest storage temperature, and the lowermost reservoir 68 will have its temperature increased the least. Because each reservoir 46 which is further from the hot end of the heat exchanger 62 will take longer to warm up than the first heat storage reservoir 66, more heat may be removed from the hot fluid stream.

A theoretical comparison between the heat exchanger 26, shown in FIG. 7, a parallel heat exchanger, a counter-flow heat exchanger, and a monolithic heat storage device illustrates the advantages of the present invention. If two gas streams of equal magnitude and one at 0° C. and the other at 100° C. are passed through a conventional parallel flow heat exchanger of sufficient length, the temperature of the exhaust gases will be approximately 50° C. for both air flows.

If the two flows, one at 100° C. and one at 0° C., are passed through a counter-flow heat exchanger of sufficient length, the gas flow which is initially at 100° C. will exit the heat exchanger at 0° C., and the gas flow which is initially at 0° C. will exit the heat exchanger at 100° C. In both the above examples, if the gas flows do not occur at the same time, the gases will move through the heat exchanger with essentially no change in temperature; in other words, the heat exchanger fails to function if the flows are not simultaneous in time.

If we now examine a monolithic heat storage device having, for example, 100 pounds of water initially at 0° C. and which has two heat exchange passages associated therewith, and an initial quantity of 100° C. air through the monolithic heat storage device, we will see that the 100 pounds of heat storing water will gradually increase in temperature, so at some point the temperature of the water will reach 50° C. If at this point we were to now flow 0° C. air through the heat storage media, the air flow would initially be warmed to 50° C. and, with time, progressively fall towards 0° C.

Employing a heat exchanger 26 constructed of heat exchanger modules 20 having ten storage reservoirs, each containing 10 pounds of water, if the equivalent quantity of 100° C. air is flowed through such a heat exchanger 26 as was flowed through the monolithic heater, we should find that the heat storage heat exchanger 26 stores more heat than the monolithic heat storage apparatus, and the heat stored is at a higher quality (i.e., at higher temperature). The top module 66 of the heat storage heat exchanger 26 containing only 1/10 of the heat storage material as the monolithic reservoir, will be heated to nearly 100° C. and we will find in the column a graduated series of temperatures in the temperature reservoirs 46, such that when a second quantity of cooled air at 0° C. is passed through the other flow passage of the heat exchanger 26, it will exit with a temperature close to that of 100° C.

Thus, by combining the principles of counter-flow heat exchange with a multiplicity of discreet heat storage reservoirs, a heat exchanger 26 may be constructed where the efficiency of a counter-flow heat exchanger is approached in a heat storage device.

Heat is stored in the heat storage reservoirs in a progression of discreet temperatures, as each reservoir comes into equilibrium with the heating fluid flow. When the heated fluid flows at a later time in counter-flow to the heating fluid, it absorbs heat first from the lowest temperature reservoirs and last from the highest temperature reservoirs, so recovering the stored heat in counterflow-like arrangement.

Figure 1:
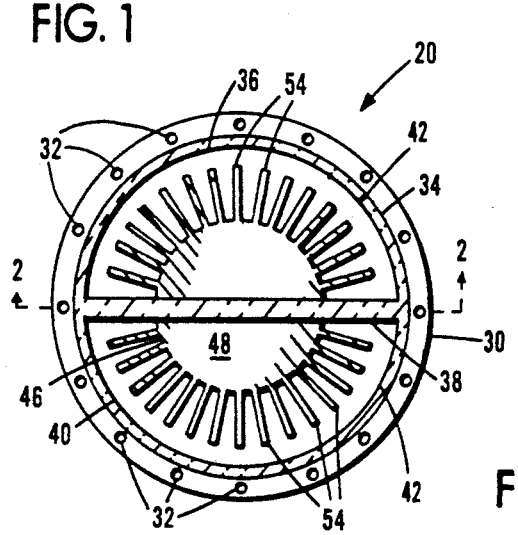
FIG. 1 is a top plan view of a heat exchanger module of this invention.
Figure 2:
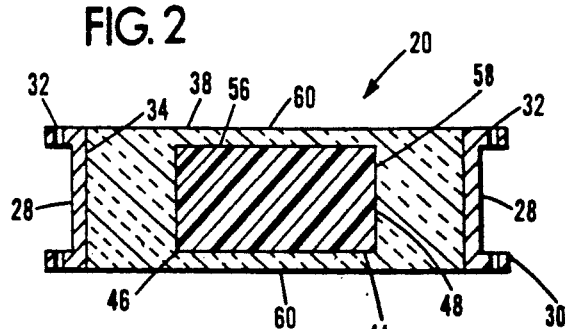
FIG. 2 is a cross-sectional view of the heat exchanger module of FIG. 1 taken along section line 2—2.
Figure 3:
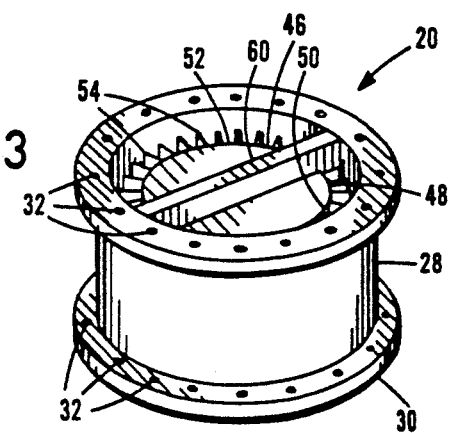
FIG. 3 is an isometric view of the heat exchanger module of FIG. 1, with wall insulation removed.
Figure 4:
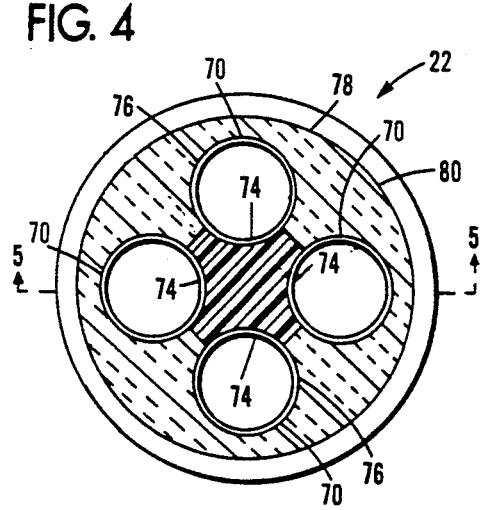
FIG. 4 is a top plan view of an alternative heat exchanger module of this invention having four fluid flow channels.

More than two fluid channels 70 may be employed in an alternate embodiment heat exchanger module 22, shown in FIGS. 4 and 5, which employs four flow channels 70. The four flow channels exchange heat through a heat storage reservoir 72 which is in thermal contact with the flow channels through surfaces 74. The flow channels 70 will preferably have insulating walls 76 where the flow passages do not adjoin the heat reservoir, to prevent flow of heat between the reservoir modules. The flow channels, additionally, may be insulated from the outer shell 78 by insulating material 80. The heat storage reservoirs 72 are insulated from each other by thermal insulation 71. The heat exchanger modules 24, illustrated in FIG. 6, have heat exchange fins or protrusions 82, which increase the heat exchange surface area between the flow channels 70 and the heat reservoir 72.

For ease of cleaning, it may be desirable in some cases to employ heat exchanger modules 22 as illustrated in FIGS. 4 and 5, without heat exchange fins and, therefore, smooth interior surfaces which are relatively easy to clean. The heat exchanger modules 22 may be joined together with bolts (not shown) or modules may be clamped together by a fixture 84, illustrated in FIG. 7, wherein the modules are stacked within a housing 86 and clamped between the housing 86 and a closure 88. The housing 86 and the closure 88 have inlets 89 and outlets 87 which direct fluids into and out of the fluid flow channels of the heat exchanger 26.

To prevent leakage through the module joints, O-rings 91 may be employed in grooves 90 between modules 22 as shown in FIG. 5 and 6.

Figure 8:
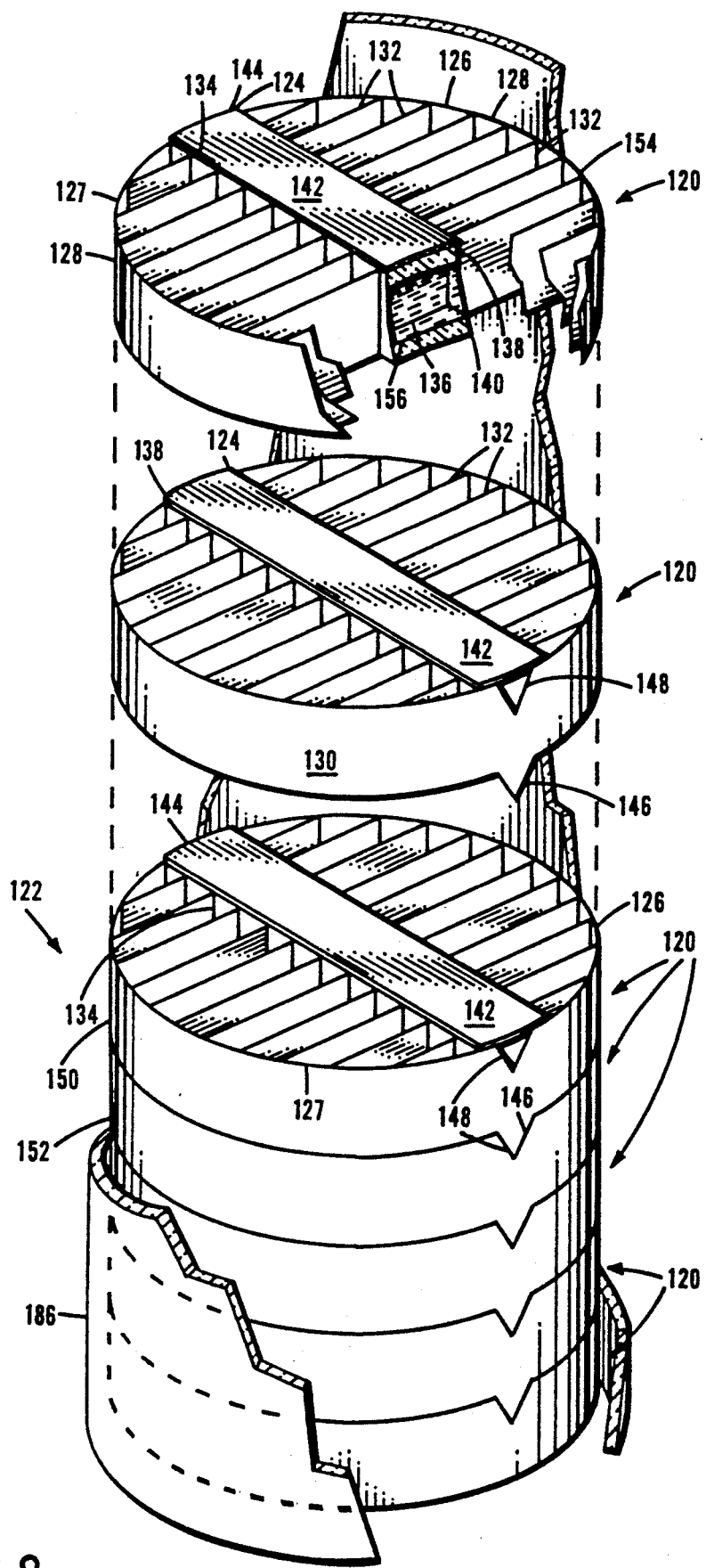
FIG. 8 is an exploded isometric view, partly cut away, of yet another embodiment of the heat exchanger of this invention having heat exchanger modules in a stacked array.

Yet another heat exchanger module 120, shown in FIG. 8, may be employed to form an alternate embodiment heat exchanger array 122. The alternative heat exchanger 120 employs a central heat storage reservoir 124 which divides the fluid channel 126 into two flow channels by bisecting the outer shell 130. The central heat storage reservoir has a multiplicity of heat conductive fins 132 which penetrate the side walls 134 of a central heat storage reservoir 124. The heat storage reservoir 124 contains a heat storage medium 136 which receives heat from the fins 132 while a warm fluid is flowing through flow passages 126. The heat storage medium 136 transmits heat by means of the fins 132 when a cool fluid is flowing through the flow passages 127.

The heat exchange module 120 has an upper insulative band 138 and a lower insulative band 140 which prevent the flow of heat between modules. The heat storage modules 120 may have gasket material 142 positioned on the top 144 of each central heat storage unit 124. The heat storage modules 120 have two indexing V-shaped projections 146 on each side of the reservoir 124. Spaced above each V-shaped projection is a V-shaped slot 148 such that when multiple heat storage modules 120 are stacked in a modular array 122 the V-shaped projections 146 of an upper heat exchange module 120 fit within the V-shaped grooves 148 of a lower module 120 thereby aligning central heat storage reservoirs 124 of the modules 120 in the array 122. The gasket material 142 forms a resilient seal between the modules 120 so preventing the flow of fluids from one side of a central heat storage module 124 to the flow passage 126 on the opposite side. The modules 120 shown in FIG. 8 may be used in a housing 86 similar to that shown in FIG. 7 or in a continuous housing 186 with adequate insulation. The heat exchange modules 120 by employing fins 132 which are continuous as they pass through the central heat storage reservoir 124 maximize the transfer of heat from the storage medium 136 to the fins 132, thereby maximizing the heat flow between the portions 133 of the fins disposed in the flow passages 126, 127 and the portions 156 of the fin which are emersed in the heat storage medium 136 inside the central heat storage reservoir 124. Leakage between flow channels may be prevented by proper compressive loading of the insulated lining surrounding the flow passages.

The heat storage material utilized in the heat reservoirs may advantageously contain water in many moderate temperature applications. Suitable liquid heat storage materials include water with anti-freeze, glycerin, ethylene glycol, and alcohol or a rust inhibitor. However, any material of high specific heat and good thermal conductivity may be used. Examples of such materials are: graphite, beryllium metal, liquid ammonia, and various plastics with specific heats approaching that of water, and phase change salt combinations, which store heat by changing phase as heat is added to the material at constant temperature.

Although the modules will, for cost reasons, normally be identical, in some situations involving large temperature extremes, it may be desirable to employ different heat storage media in different modules. For example, in a high temperature application the high temperature end of the heat exchanger could employ graphite and beryllium. The mid-range might employ plastics; and the moderate range, liquid water or ammonia. A graded column of phase change salts could be used to advantageously store heat in a heat exchanger 20 with minimum reservoir volume for total heat storage capability.

It should be understood that although the heat exchangers constructed from heat exchanger modules 20, 22, 24, and 120 can be used to exchange heat between non-simultaneous flows of fluid, they will function as normal counter-flow heat exchangers with steady state fluid flows.

It should also be understood that the heat exchanger 26, while preferably used as a counter-flow heat exchanger, may by used as a parallel flow heat exchanger.

It should additionally be understood that where fins are provided on the surface of the heat exchange reservoirs, the surface of the reservoirs between fins may advantageously be insulated to prevent radiative heat transfer between modules.

The heat exchangers described herein could advantageously be used with filters of any conventional kind. Filtering of the fluid is particularly advantageous when the heat exchanger 26 is employed in bringing fresh air into a building or residence. In many cases, it will be desirable to utilize a particle filter, either mechanical or electrostatic to remove dust particles, bacteria, viri, fungi and pollen spores, smoke, smog or chemical compounds. It also may be advantageous to use chemical filtration for the removal of carbon dioxide, ozone or odorific compounds and the like. Furthermore, filters may be advantageously employed where the heat exchanging fluids are industrial waste gasses which may contain certain pollutants which the filters may advantageously remove.

The heat exchanger 26 will in many cases require pumps or fans to move the heat exchanging fluids through the heat exchanger. The location of the fans may, depending on the application, be located on the ends of the heat exchanger where the gasses enter, or alternatively may be located on either end or between the two ends, for certain applications. Furthermore flow through the heat exchanger may be regulated by vanes, louvers, or valves, which in turn may be under automatic control.

It should also be noted that the depth of each module and the relative dimensions of the heat storage reservoirs may be adjusted to suit particular heat exchange needs and materials.

It should be noted that although the modules have been disclosed as circular in cross section, square, oval, hexagonal, pentagonal, or other shapes may be employed where desired.

It should further be noted that cooling of gases may cause the condensation of liquids suspended therein, and condensate removal drains may be provided in the heat exchangers 20, 22, 24, 26, 120. For example, a water trap may be used to drain water without diverting air or gases from the heat exchanger.

It should further be understood that the heat storage reservoir 46 could be connected to supplemental energy sources such as solarpanels, waste fluids, ground water, etc. by means of fluid recirculation loops which circulate or heat exchange with the heat storage material 58. And likewise two or more heat exchangers 20, 22, 24, 26, 120 could have their reservoirs 46 interconnected to allow the transfer of heat from one section (of a plant or building) to another.

It is understood that the invention is not confined to the particular construction and arrangement of parts as herein illustrated and described, but embraces such modified forms thereof as come within the scope of the following claims.

I claim:

1. A heat storage and transfer module for use in a heat exchanger comprising:
   (a) a reservoir having a surface, the reservoir containing heat retentive heat conductive material;
   (b) an insulating baffle attached to the reservoir surface and dividing the surface into a plurality of regions;
   (c) thermally conducting fins attached to the surface of each region defined by the baffle so that the heat transfer module may absorb heat in a heat exchanger through the fins attached to a first region, store the heat by means of the heat retentive material and then transfer heat by means of the fins on a second region of the surface; and
   (d) a shell within which the insulating baffle is mounted, the baffle dividing the shell into a plurality of flow channels.

2. The module of claim 1 wherein the shell is cylindrical, and wherein the reservoir is symmetric about the cylinder axis; the reservoir extending less than the axial length of the shell.

3. The module of claim 1 wherein the heat retentive material comprises water.

4. The module of claim 1 wherein the heat retentive material is chosen from the group consisting of water, graphite, berillium, a phase change salt or a plastic with specific heat of greater than 0.5.

5. The module of claim 1 wherein the shell has a protrusion extending from the shell and portions of the shell define a slot beneath the protrusion that the protrusion such on a first module may mate within the slot on a second module to align the first and second modules.

6. A heat exchanger incorporating thermal storage for heat transfer between fluids comprising:

(a) a plurality of fluid flow channels aligned in parallel relation to one another, wherein the fluid flow channel are defined by a plurality of modular shells, and wherein each shell has a protrusion extending therefrom, and each shell has portions defining a slot beneath the protrusion, and wherein the protrusion of one of the plurality of modular shells engages with the slot of another of the shells, so aligning the shells of the flow channels; and (b) a plurality of heat retentive reservoirs having surfaces and being spaced parallel to one another, the fluid flow channels having portions which adjoin in a heat conducting fashion the surfaces of each reservoir, wherein heat from a fluid flowing in one channel is transferred to the reservoirs and thence to a fluid flowing in a second channel at a later time.

7. A modular heat exchanger capable of non-simultaneous heat transfer between a plurality of fluid flows comprising a plurality of stacked modules, wherein each module has an outer shell, the shell being open at the top and bottom, and connected with another module shell in a stacked array; an insulating partition joined to the shell and dividing the shell into a plurality of flow channels, the partition having portions defining a hole, the hole connecting the flow channels; and a thermally conductive heat storage reservoir spaced within the hole and occluding the hole so that substituting all heat transferred from one flow channel to another is transferred through the heat storage reservoir, the heat exchanger being adapted to Permit heat to be transferred between a plurality of fluids, whose flow rate through the heat exchanger may vary independently with time for each fluid.

8. The modular heat exchanger of claim 7 wherein each module has at least one indexing protrusion extending from the outer shell, and portions of the outer shell define a slot beneath the protrusion, and wherein the protrusions of one module engage with the slots of an adjacent module to align the flow channels.

9. The heat exchanger of claim 7 wherein the heat storage reservoir contains a quantity of water for the purpose of heat storage.

10. The heat exchanger of claim 7 wherein the heat conductive heat storage reservoir further comprises a thermally conducting surface defining a volume, the volume containing a conductive heat storage material, the surface having protrusions for improving the heat exchange between fluids flowing in the channels and the heat storage material.

11. The heat exchanger of claim 7 wherein the heat storage material is chosen from the group consisting of water, graphite, beryllium, a phase change salt or a plastic with specific heat of greater than 0.5.

* * * * *